US008932762B2

(12) United States Patent
Sano et al.

(10) Patent No.: US 8,932,762 B2
(45) Date of Patent: *Jan. 13, 2015

(54) ACTIVE MATERIAL AND POSITIVE ELECTRODE AND LITHIUM-ION SECOND BATTERY USING SAME

(71) Applicant: TDK Corporation, Tokyo (JP)

(72) Inventors: Atsushi Sano, Tokyo (JP); Keitaro Otsuki, Tokyo (JP); Yosuke Miyaki, Tokyo (JP); Takeshi Takahashi, Tokyo (JP); Akiji Higuchi, Kyoto (JP)

(73) Assignee: TDK Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/968,560

(22) Filed: Aug. 16, 2013

(65) Prior Publication Data

US 2013/0330261 A1    Dec. 12, 2013

Related U.S. Application Data

(63) Continuation of application No. 12/568,075, filed on Sep. 28, 2009.

(30) Foreign Application Priority Data

Sep. 30, 2008   (JP) .................................. 2008-254372

(51) Int. Cl.
*H01M 4/13*       (2010.01)
*H01M 4/58*       (2010.01)
*C01B 25/37*      (2006.01)
*C01B 25/45*      (2006.01)
*H01M 4/136*      (2010.01)
*H01M 10/052*     (2010.01)

(52) U.S. Cl.
CPC ................ *C01B 25/45* (2013.01); *H01M 4/136* (2013.01); *H01M 10/052* (2013.01); *H01M 4/5825* (2013.01); *C01B 25/37* (2013.01)
USPC ................. 429/231.5; 429/231.9; 429/231.95

(58) Field of Classification Search
USPC ............................... 429/231.5, 231.95, 231.9
See application file for complete search history.

(56) References Cited

U.S. PATENT DOCUMENTS 6,528,033 B1   3/2003   Barker et al.
6,702,961 B2   3/2004   Barker et al.
6,716,372 B2   4/2004   Barker et al.
(Continued)

FOREIGN PATENT DOCUMENTS

CN    101279727 A    10/2008
EP    1 850 409 A1   10/2007
(Continued)

OTHER PUBLICATIONS

Dupre et al., *Positive electrode materials for lithium batteries based on $VOPO_4$*, Solid State Ionics, vol. 140, 2001, pp. 209-221, Paris, France.

(Continued)

*Primary Examiner* — Jane Rhee
(74) *Attorney, Agent, or Firm* — Oliff PLC

(57) ABSTRACT

A method for manufacturing an active material containing a triclinic $LiVOPO_4$ crystal particle that has a spherical form and an average particle size of 20 to 200 nm. The method includes a step of manufacturing the crystal particle by hydrothermal synthesis.

10 Claims, 10 Drawing Sheets

(56) References Cited

U.S. PATENT DOCUMENTS

| | | | |
|---|---|---|---|
| 6,730,281 | B2 | 5/2004 | Barker et al. |
| 7,060,206 | B2 | 6/2006 | Barker et al. |
| 7,276,218 | B2 | 10/2007 | Barker et al. |
| 7,337,010 | B2 | 2/2008 | Howard et al. |
| 7,550,098 | B2 | 6/2009 | Barker et al. |
| 7,635,541 | B2 | 12/2009 | Scott et al. |
| 7,682,745 | B2 | 3/2010 | Howard et al. |
| 7,807,299 | B2 | 10/2010 | Howard et al. |
| 7,811,705 | B2 | 10/2010 | Scott et al. |
| 7,829,242 | B2 | 11/2010 | Hörpel et al. |
| 7,875,389 | B2 | 1/2011 | Scott et al. |
| 7,927,742 | B2 | 4/2011 | Scott et al. |
| 8,105,714 | B2 | 1/2012 | Schmidt et al. |
| 8,105,733 | B2 | 1/2012 | Hoerpel et al. |
| 8,163,441 | B2 | 4/2012 | Hoerpel et al. |
| 8,383,269 | B2 | 2/2013 | Scott et al. |
| 8,449,980 | B2 | 5/2013 | Suzuki et al. |
| 8,492,031 | B2 | 7/2013 | Suzuki et al. |
| 2002/0041998 | A1 | 4/2002 | Hosoya et al. |
| 2002/0182497 | A1 | 12/2002 | Kohzaki et al. |
| 2005/0255026 | A1 | 11/2005 | Barker et al. |
| 2006/0093871 | A1 | 5/2006 | Howard et al. |
| 2007/0001153 | A1 | 1/2007 | Barker et al. |
| 2008/0020277 | A1 | 1/2008 | Barker et al. |
| 2008/0020278 | A1 | 1/2008 | Schmidt et al. |
| 2008/0044728 | A1 | 2/2008 | Schmidt et al. |
| 2008/0206639 | A1 | 8/2008 | Kurihara |
| 2008/0268339 | A1 | 10/2008 | Suzuki |
| 2009/0068080 | A1* | 3/2009 | Faulkner .................. 423/306 |
| 2009/0087660 | A1* | 4/2009 | Suzuki et al. ............. 428/403 |
| 2009/0155689 | A1 | 6/2009 | Zaghib et al. |
| 2009/0236564 | A1 | 9/2009 | Yasunaga et al. |
| 2009/0274849 | A1 | 11/2009 | Scott et al. |
| 2010/0078591 | A1 | 4/2010 | Sano et al. |
| 2010/0233545 | A1 | 9/2010 | Sano et al. |
| 2010/0316898 | A1 | 12/2010 | Howard et al. |
| 2011/0052995 | A1 | 3/2011 | Sano et al. |
| 2011/0133118 | A1 | 6/2011 | Honma et al. |
| 2013/0153821 | A1 | 6/2013 | Evenson et al. |

FOREIGN PATENT DOCUMENTS

| | | |
|---|---|---|
| JP | A-05-159807 | 6/1993 |
| JP | A-11-329427 | 11/1999 |
| JP | A-2002-110163 | 4/2002 |
| JP | A-2003-036889 | 2/2003 |
| JP | A-2003-68304 | 3/2003 |
| JP | A-2003-173777 | 6/2003 |
| JP | A-2003-203628 | 7/2003 |
| JP | A-2003-292308 | 10/2003 |
| JP | A-2003-292309 | 10/2003 |
| JP | A-2004-063386 | 2/2004 |
| JP | A-2004-095385 | 3/2004 |
| JP | A-2004-303527 | 10/2004 |
| JP | A-2005-123107 | 5/2005 |
| JP | A-2006-156256 | 6/2006 |
| JP | A-2006-302671 | 11/2006 |
| JP | B2-3933470 | 3/2007 |
| JP | A-2007-087841 | 4/2007 |
| JP | A-2007-109533 | 4/2007 |
| JP | A-2007-294461 | 11/2007 |
| JP | B2-4043852 | 11/2007 |
| JP | A-2008-517435 | 5/2008 |
| JP | A-2008-519399 | 6/2008 |
| JP | A-2008-277119 | 11/2008 |
| JP | A-2008-277120 | 11/2008 |
| JP | A-2008-277152 | 11/2008 |
| JP | A-2009-298687 | 12/2009 |
| WO | WO 2007-113624 A1 | 10/2007 |

OTHER PUBLICATIONS

Dupre et al., *Electrochemical performance of different Li-VOPO$_4$ systems*, Journal of Power Sources, vol. 97-98, 2001, pp. 532-534, Paris, France.

Kerr, T.A., et al., "Highly Reversible Li Insertion at 4 V in ε-VOPO$_4$/α-LiVOPO$_4$ Cathodes," *Electrochemical and Solid-State Letters*, 3 (10), 2000, pp. 460-462.

Jan. 30, 2014 Office Action issued in U.S. Appl. No. 12/868,142.

Feb. 5, 2014 Office Action issued in U.S. Appl. No. 12/568,075.

Azmi et al, "LiVOPO$_4$ as a New Cathode Materials for Li-ion Rechargeable Battery," Journal of Power Sources, vol. 146, pp. 525-528, 2005.

Barker et al., "Electrochemical Properties of Beta-LiVlPO$_4$ Prepared by Carbothermal Reduction," Journal of the Electrochemical Society, vol. 151, No. 12, pp. A796-A800, Apr. 26, 2004.

Gaubicher et al., "Li/β-VOPO$_4$: A New 4 V System for Lithium Batteries," Journal of the Electrochemical Society, vol. 146, No. 12, pp. 4375-4379, Jul. 1999.

Kuwahara et al., "High-Rate Properties of LiFePO$_4$/Carbon Composites as Cathode Materials for Lithium-ion Batteries," Ceramics International, vol. 34, pp. 863-866, Sep. 29, 2007.

Liang et al, "Lithium Iron Phosphate with High-Rate Capability Synthesized through Hydrothermal Reaction in Glucose Solution," Journal of Power Sources, vol. 184, pp. 538-542, 2008.

Lii et al., "Hydrothermal Synthesis, Structure, and Magnetic Properties of a New Polymorph of Lithium Vanadyl(IV) Orthophosphate: Beta-LiVOPO$_4$," Journal of Solid State Chemistry, vol. 95, pp. 352-359, 1991.

Nagamine et al., "Selective Synthesis of Lithium Ion-Conductive Beta-LiVOPO$_4$ Crystals via Glass-Ceramic Processing," Journal of American Ceramic Society, vol. 91, No. 12, pp. 3920-3925, 2008.

Oct. 24, 2012 Office Action issued in U.S. Appl. No. 12/568,145.

Feb. 21, 2013 Office Action issued in U.S. Appl. No. 12/568,145.

Aug. 1, 2013 Office Action issued in U.S. Appl. No. 12/568,145.

Sep. 13, 2013 Office Action issued in U.S. Appl. No. 12/723,101.

Nov. 23, 2012 Office Action issued in U.S. Appl. No. 12/868,142.

Apr. 12, 2013 Office Action issued in U.S. Appl. No. 12/868,142.

Oct. 2, 2013 Office Action issued in U.S. Appl. No. 12/868,142.

Sep. 11, 2013 Office Action issued in U.S. Appl. No. 12/568,075.

Oct. 10, 2014 Office Action issued in U.S. Appl. No. 12/723,101.

\* cited by examiner

ACTIVE MATERIAL AND POSITIVE ELECTRODE AND LITHIUM-ION SECOND BATTERY USING SAME

CROSS-REFERENCE TO PRIOR APPLICATIONS

This is a continuation of application Ser. No. 12/568,075 filed Sep. 28, 2009, and claims the benefit of Japanese Application No. 2008-254372 filed Sep. 30, 2008. The entire disclosures of the prior applications are hereby incorporated by reference herein in their entirety.

BACKGROUND

The present invention relates to an active material, and a positive electrode and lithium-ion secondary battery using the same.

Laminar oxides ($LiCoO_2$, $LiNiO_2$, $LiNiMnCoO_2$, etc.), spinel compounds ($LiMn_2O_4$, etc.), and lithium-containing phosphates ($LiFePO_4$, etc.) have conventionally been known as positive electrode active materials for lithium-ion secondary batteries.

On the other hand, Li has been known to be reversibly inserted into and de-inserted from crystals represented by structural formulas of $VOPO_4$ and $LiVOPO_4$ (see Japanese Patent Application Laid-Open No. 2003-68304; N. Dupre et al., Solid State Ionics, 140, pp. 209-221 (2001); and N. Dupre et al., J. Power Sources, 97-98, pp. 532-534 (2001)). $LiVOPO_4$ has been under study as a material substituting for the above-mentioned laminar oxide or spinel compound, since it can enhance the safety of batteries and the stability of battery characteristics. While $LiVOPO_4$ takes a number of crystal systems, electrochemical characteristics of its orthorhombic crystal (β type) and triclinic crystal (α type) have been reported. Japanese Patent Application Laid-Open No. 2004-303527 discloses a method of improving a rate characteristic of $LiVOPO_4$ by increasing its specific surface area with orthorhombic $LiVOPO_4$ crystals having a median size of 20 μm or less.

SUMMARY OF THE INVENTION

However, orthorhombic $LiVOPO_4$ crystals such as those described in Japanese Patent Application Laid-Open No. 2004-303527 are problematic in that they are likely to cause a decrease in capacity when charging and discharging are repeated, thus being inferior in cycle characteristic. On the other hand, triclinic $LiVOPO_4$ crystals are problematic in that they are inferior to the orthorhombic $LiVOPO_4$ crystals in terms of crystal symmetry, thus being harder to obtain favorable Li-ion conductivity, thereby exhibiting a lower rate characteristic.

In view of the above-mentioned problems of the prior art, it is an object of the present invention to provide an active material which contains a crystal of $LiVOPO_4$ and can attain a favorable cycle characteristic and a favorable rate characteristic at the same time, and a positive electrode and lithium-ion secondary battery using the same.

For achieving the above-mentioned object, the present invention provides an active material containing a triclinic $LiVOPO_4$ crystal particle, while the crystal particle has a spherical form and an average particle size of 20 to 200 nm.

Thus constructed active material can attain a favorable cycle characteristic and a favorable rate characteristic at the same time and yield a sufficient capacity. This active material is presumed to have improved the rate characteristic, which is a drawback of the triclinic $LiVOPO_4$ crystals, by speeding up Li-ion diffusion with a fine spherical particle having the above-mentioned average particle size employed as a triclinic $LiVOPO_4$ crystal particle. It is also inferred that a smaller surface area reduces unnecessary reactions with electrolytic solutions, thereby improving the cycle characteristic.

Preferably, in the active material of the present invention, the crystal particle has a BET specific surface area of 2 to 50 $m^2/g$. This seems to reduce unnecessary reactions with electrolytic solutions, thereby improving the cycle characteristic.

Preferably, in the active material of the present invention, the crystal particle has a longer to shorter diameter ratio (longer diameter/shorter diameter) of 1 to 2. This makes it possible to adjust the BET specific surface area to an optimal value.

The present invention also provides a positive electrode containing the active material of the present invention. By containing the active material of the present invention, this positive electrode can attain a favorable cycle characteristic and a favorable rate characteristic at the same time and yield a sufficient capacity.

The present invention further provides a lithium-ion secondary battery including the positive electrode of the present invention. By including the positive electrode containing the active material of the present invention, this lithium-ion secondary battery can attain a favorable cycle characteristic and a favorable rate characteristic at the same time and yield a sufficient capacity.

As in the foregoing, the present invention can provide an active material which contains a crystal of $LiVOPO_4$ and can attain a favorable cycle characteristic and a favorable rate characteristic at the same time, and a positive electrode and lithium-ion secondary battery using the same.

DESCRIPTION OF EMBODIMENTS

Figure 1:
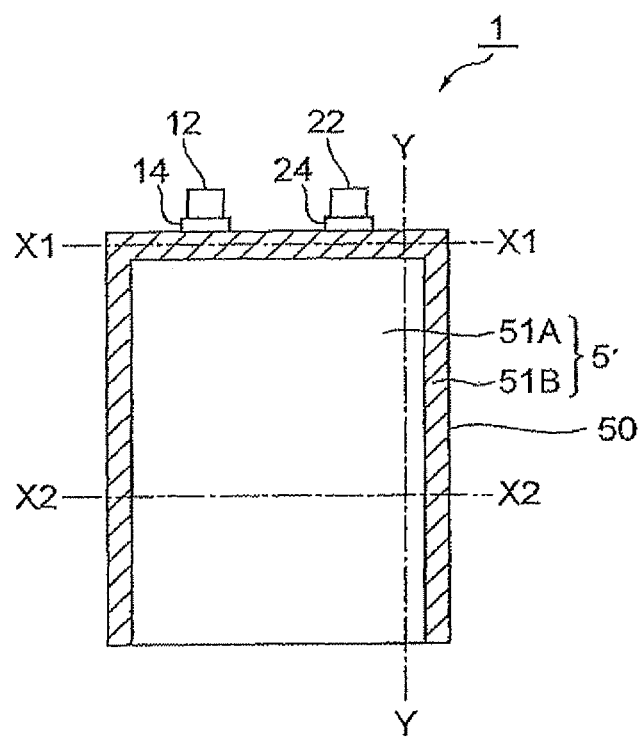
[FIG. 1] is a front view illustrating a preferred embodiment of the lithium-ion secondary battery in accordance with the present invention.

In the following, preferred embodiments of the present invention will be explained in detail with reference to the drawings as the case may be. In the drawings, the same or equivalent parts will be referred to with the same signs while omitting their overlapping descriptions. Ratios of dimensions in the drawings are not limited to those depicted.

Active Material and Method of Manufacturing the Same

The active material of the present invention contains a triclinic $LiVOPO_4$ crystal particle, while the crystal particle has a spherical form and an average particle size of 20 to 200 nm.

In the crystal particle, the average particle size is required to be 20 to 200 nm and is preferably 25 to 150 nm, more preferably 30 to 100 nm. When the average particle size is less than 20 nm, the discharge voltage decreases, thereby lowering the capacity. When the average particle size exceeds 200 nm, on the other hand, the rate characteristic deteriorates.

The longer to shorter diameter ratio (longer diameter/shorter diameter) of the crystal particle is preferably 1 to 2, more preferably 1.0 to 1.8. The longer to shorter diameter ratio of the crystal particle closer to 1 is more preferred, since the crystal particle attains a form closer to a true sphere. When the longer to shorter diameter ratio exceeds 2, the cycle characteristic tends to deteriorate.

Here, the shorter diameter of the crystal particle refers to the distance between two parallel lines tangential to the outer periphery of the crystal particle which yield the shortest distance therebetween while sandwiching the particle. On the other hand, the longer diameter of the crystal particle refers to the distance between two parallel lines tangential to the outer periphery of the crystal particle which yield the longest distance therebetween while sandwiching the particle and being perpendicular to the former parallel lines defining the shorter diameter. The longer to shorter diameter ratio (longer diameter/shorter diameter) in the present invention is determined as an average of respective measured values of longer to shorter diameter ratio (longer diameter/shorter diameter) in given 10 crystal particles in an electron micrograph of crystal particles. The average particle size in the present invention is determined as an average of respective measured values of longer diameter in given 10 crystal particles in an electron micrograph of crystal particles.

The BET specific surface area of the crystal particle is preferably 2 to 50 $m^2/g$, more preferably 2.2 to 35 $m^2/g$, further preferably 2.5 to 20 $m^2/g$. The cycle characteristic tends to deteriorate when the BET specific surface area of the crystal particle is less than 2 $m^2/g$ or more than 50 $m^2/g$. The BET specific surface area is determined from a nitrogen adsorption isotherm by using the BET adsorption isotherm equation.

The active material of the present invention may consist of the above-mentioned crystal particle alone or be a composite material of the crystal particle and other components. Examples of the composite material include one in which a surface of the crystal particle is coated with electrically conductive layer which consists of carbon or the like and one in which a conductive auxiliary such as carbon black is carried by the crystal particle. As the other components forming the composite material, materials used in positive electrodes of lithium-ion secondary batteries can be employed without any restrictions in particular.

Preferably, in the active material of the present invention, the spherical triclinic $LiVOPO_4$ crystal particle is manufactured by hydrothermal synthesis. Manufacturing the crystal particle by hydrothermal synthesis makes it possible to control the particle size, so as to yield the spherical triclinic $LiVOPO_4$ crystal particle having the above-mentioned average particle size. Thus manufactured spherical triclinic $LiVOPO_4$ crystal particle has a higher capacity and superior rate and cycle characteristics as compared with conventional triclinic $LiVOPO_4$ crystals.

Conventionally known methods of synthesizing triclinic $LiVOPO_4$ crystals include a method of mixing, pulverizing, and firing a solid to become a material and a method of dissolving a material into water and evaporating the mixture to dryness. However, it is difficult for these conventional synthesizing methods to manufacture fine spherical triclinic $LiVOPO_4$ crystal particles having the above-mentioned average particle size.

The spherical triclinic $LiVOPO_4$ crystal particle in the present invention can be manufactured by the following procedure, for example, by hydrothermal synthesis.

That is, the triclinic $LiVOPO_4$ crystal particle can be obtained by heat-processing at least an aqueous phosphate compound solution and a vanadium-containing compound which are sealed in a closed container such as an autoclave (first heat treatment step), adding at least an Li-containing compound to the resulting product, further heat-processing the mixture (second heat treatment step), and pulverizing the resulting product. Since thus obtained crystal particle may include crystal particles which are not spherical and those having a relatively large particle size depending on manufacturing conditions, the powder obtained by the foregoing steps is heated (fired) at a temperature of at least 450° C. but not higher than 600° C. in an air atmosphere, so as to grow a spherical structure preferentially (firing step), and then is classified by airflow classification or the like (classification step), whereby the spherical triclinic $LiVOPO_4$ crystal particle having the target particle size can be obtained.

Here, an aqueous $H_3PO_4$ solution is preferred as the aqueous phosphate compound solution. $V_2O_5$ is preferred as the vanadium-containing compound. $LiOH \cdot H_2O$ is preferred as the Li-containing compound.

In the first heat treatment step, the heating temperature is preferably 60 to 150° C., more preferably 80 to 120° C. Such a heating temperature tends to allow a uniform precursor to be made. The heat treatment is preferably carried out for 1 to 30 hr, more preferably 3 to 20 hr. Such a heat treatment time tends to allow a uniform precursor to be made. Preferably, the first heat treatment step is carried out while stirring the material.

In the second heat treatment step, the heating temperature is preferably 150 to 200° C., more preferably 160 to 185° C. Such a heating temperature tends to allow a spherical triclinic $LiVOPO_4$ crystal having a large charge/discharge capacity to be made. The heat treatment is preferably carried out for 3 to 20 hr, more preferably 5 to 15 hr. Such a heating time tends to allow a spherical triclinic $LiVOPO_4$ crystal having a large charge/discharge capacity to be made. The second heat treatment step is also preferably carried out while stirring the material. A step of washing impurities away from the powder may be provided after the second heat treatment step. Under some conditions, viscous matters may be formed in the mixture in the first and second heat treatment steps. Such viscous matters can be washed with a solvent such as water and dried by heating at a temperature at least lower than the second heat treatment temperature in the washing step.

In the firing step, the heating temperature is preferably 450 to 600° C., more preferably 480 to 580° C. Such a heating temperature tends to make it easier to yield the spherical triclinic $LiVOPO_4$ crystal. The firing is preferably carried out for 1 to 20 hr, more preferably 2 to 10 hr. Such a firing time tends to be able to sufficiently grow crystals having a spherical structure.

The classifying step can be carried out by centrifugal airflow classification. The classifying step makes it possible to yield a crystal particle having a desirable form and particle size. The classifying step allows crystal particles having a spherical form whose average particle size falls within the range of 20 to 200 nm to be obtained efficiently and reliably.

When forming a composite material of the triclinic LiVOPO$_4$ crystal and other components as the active material of the present invention, it will be preferred if the other components to form the composite are added in at least one of the first and second heat treatment steps. For example, adding a carbon particle or carbon source in the first or second heat treatment step can yield a composite material of the triclinic LiVOPO$_4$ crystal and carbon particle or a composite material in which a carbon layer is formed on the surface of the triclinic LiVOPO$_4$ crystal. Carbon black is preferred as the carbon particle. As the carbon source, organic acids and alcohols are preferred; ascorbic acid, which is an organic acid, is more preferred.

Adding the carbon source in at least one of the first and second heat treatment steps is also preferred, since the particle growth is suppressed by carbon covering the surface of the crystal particle, whereby finer crystal particles can be obtained.

Lithium-Ion Secondary Battery and Method of Manufacturing the Same

Figure 2:
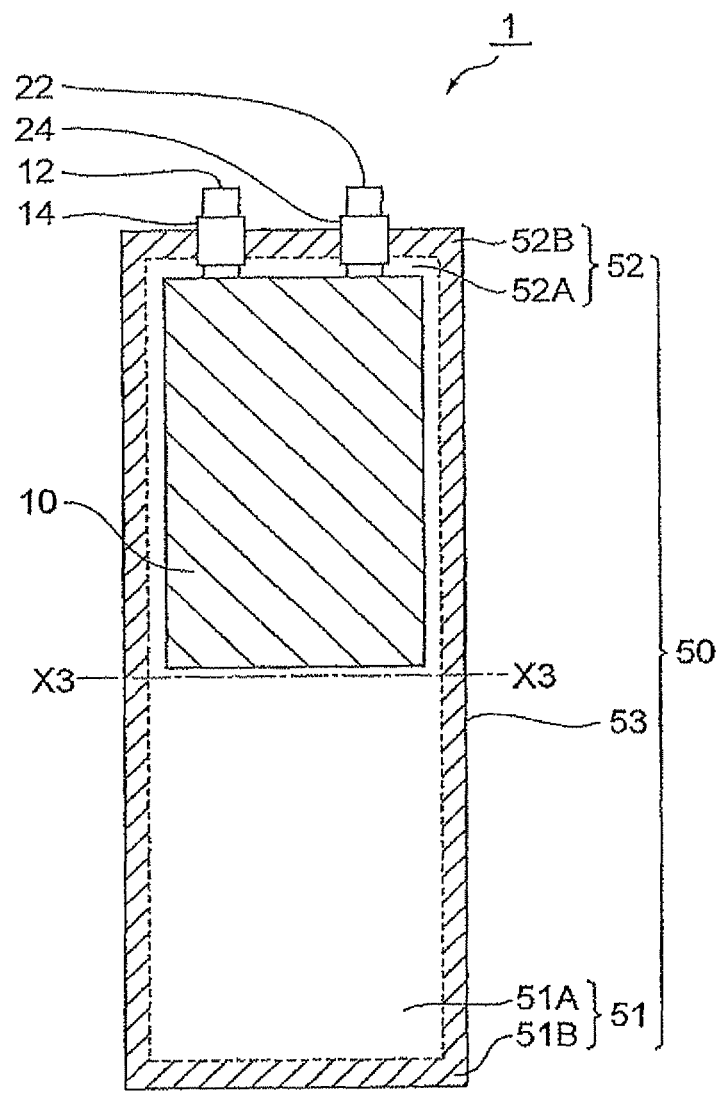
[FIG. 2] is an unfolded view of the inside of the lithium-ion secondary battery illustrated in FIG. 1 as seen in a direction normal to a surface of a negative electrode 10.
Figure 3:
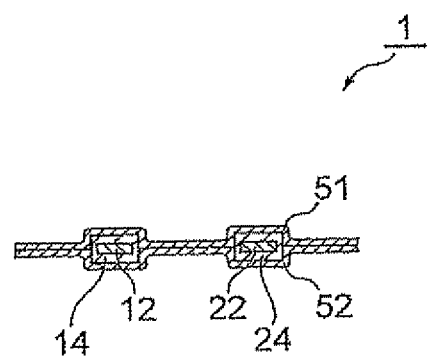
[FIG. 3] is a schematic sectional view of the lithium-ion secondary battery taken along the line X1-X1 of FIG. 1.
Figure 4:
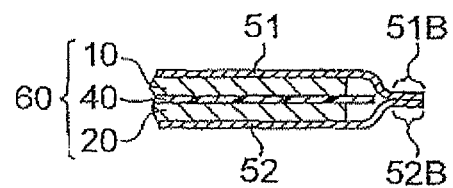
[FIG. 4] is a schematic sectional view illustrating a main part of the lithium-ion secondary battery taken along the line X2-X2 of FIG. 1.
Figure 5:
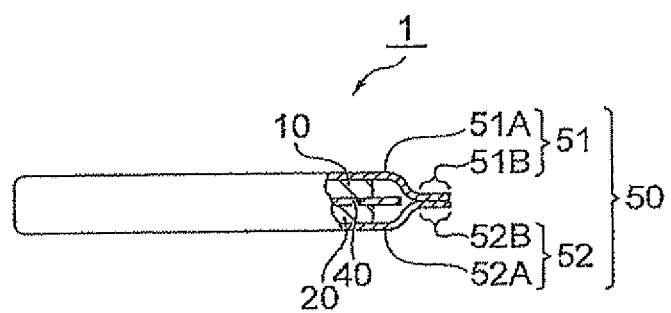
[FIG. 5] is a schematic sectional view illustrating a main part of the lithium-ion secondary battery taken along the line Y-Y of FIG. 1.

FIG. 1 is a front view illustrating a preferred embodiment of the lithium-ion secondary battery in accordance with the present invention. FIG. 2 is an unfolded view of the inside of the lithium-ion secondary battery illustrated in FIG. 1 as seen in a direction normal to a surface of a negative electrode 10. FIG. 3 is a schematic sectional view of the lithium-ion secondary battery taken along the line X1-X1 of FIG. 1. FIG. 4 is a schematic sectional view illustrating a main part of the lithium-ion secondary battery taken along the line X2-X2 of FIG. 1. FIG. 5 is a schematic sectional view illustrating a main part of the lithium-ion secondary battery taken along the line Y-Y of FIG. 1.

As illustrated in FIGS. 1 to 5, the lithium-ion secondary battery 1 is mainly constituted by a planar negative electrode 10 and a planar positive electrode 20 which oppose each other, a planar separator 40 arranged between and adjacent to the negative and positive electrodes 10, 20, an electrolytic solution containing a lithium ion, a case (outer package) 50 accommodating them in a closed state, a negative electrode lead 12 having one end part electrically connected to the negative electrode 10 and the other end part projecting out of the case 50, and a positive electrode lead 22 having one end part electrically connected to the positive electrode 20 and the other end part projecting out of the case 50. The positive electrode 20 contains the above-mentioned active material of the present invention.

In this specification, the "negative electrode", which is based on the polarity of the battery at the time of discharging, refers to an electrode which releases electrons by an oxidation reaction at the time of discharging. The "positive electrode", which is based on the polarity of the battery at the time of discharging, refers to an electrode which receives electrons by a reduction reaction at the time of discharging.

Constituents of this embodiment will now be explained in detail with reference to FIGS. 1 to 7.

Figure 6:
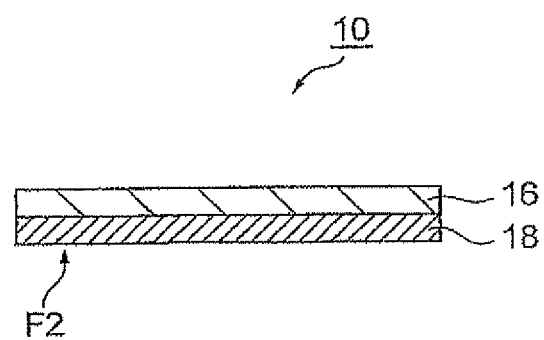
[FIG. 6] is a schematic sectional view illustrating an example of basic structures of the negative electrode in the lithium-ion secondary battery illustrated in FIG. 1.
Figure 7:
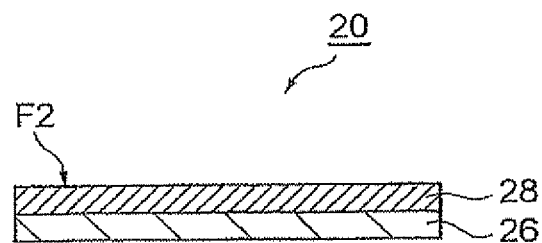
[FIG. 7] is a schematic sectional view illustrating an example of basic structures of the positive electrode in the lithium-ion secondary battery illustrated in FIG. 1.

First, the negative and positive electrodes 10, 20 will be explained. FIG. 6 is a schematic sectional view illustrating an example of basic structures of the negative electrode 10 in the lithium-ion secondary battery 1 illustrated in FIG. 1. FIG. 7 is a schematic sectional view illustrating an example of basic structures of the positive electrode 20 in the lithium-ion secondary battery 1 illustrated in FIG. 1.

As illustrated in FIG. 6, the negative electrode 10 is constituted by a current collector 16 and a negative electrode active material containing layer 18 formed on the current collector 16. As illustrated in FIG. 7, the positive electrode 20 is constituted by a current collector 26 and a positive electrode active material containing layer 28 formed on the current collector 26.

The current collectors 16, 26 are not limited in particular as long as they are good conductors which can sufficiently transfer electric charges to the negative and positive electrode active material containing layers 18, 28, respectively; known current collectors employed in lithium-ion secondary batteries can be used. Examples of the current collectors 16, 26 include metal foils made of copper and aluminum, respectively.

The negative electrode active material containing layer 18 of the negative electrode 10 is mainly constituted by a negative electrode active material and a binder. Preferably, the negative electrode active material containing layer 18 further contains a conductive auxiliary.

The negative electrode active material is not limited in particular as long as it allows occlusion and release of lithium ions, desorption and insertion (intercalation) of lithium ions, or doping and undoping of lithium ions and their counteranions (e.g., PF$_6^-$ and ClO$_4^-$) to proceed reversibly; known negative electrode active materials can be used. Examples of the negative electrode active material include carbon materials such as natural graphite, synthetic graphite, non-graphitizing carbon, graphitizable carbon, and low-temperature-finable carbon; metals such as Al, Si, and Sn which are combinable with lithium; amorphous compounds mainly composed of oxides such as SiO, SiO$_2$, SiO$_>$, and SnO$_2$; lithium titanate (Li$_4$Ti$_5$O$_{12}$); and TiO$_2$.

As the binder used in the negative electrode 10, known binders can be employed without any restrictions in particular. Examples include fluororesins such as polyvinylidene fluoride (PVDF), polytetrafluoroethylene (PTFE), tetrafluoroethylene/hexafluoropropylene copolymers (FEP), tetrafluoroethylene/perfluoroalkylvinyl ether copolymers (PFA), ethylene/tetrafluoroethylene copolymers (ETFE), polychlorotrifluoroethylene (PCTFE), ethylene/chlorotrifluoroethylene copolymers (ECTFE), and polyvinyl fluoride (PVF). The binder not only binds constituent materials such as active material particles, the conductive auxiliary added when necessary, and the like together, but also contributes to binding these constituent materials to the current collector.

Other examples of the binder include fluorine rubbers based on vinylidene fluoride such as fluorine rubbers based on vinylidene fluoride/hexafluoropropylene (VDF/HFP-based fluorine rubbers).

Still other examples of the binder include polyethylene, polypropylene, polyethylene terephthalate, aromatic polyamides, cellulose, styrene/butadiene rubber, isoprene rubber, butadiene rubber, and ethylene/propylene rubber. Also employable are thermoplastic elastomeric polymers such as styrene/butadiene/styrene block copolymers and hydrogenated derivatives thereof, styrene/ethylene/butadiene/styrene copolymers, and styrene/isoprene/styrene block copolymers and hydrogenated derivatives thereof. Further employable are syndiotactic 1,2-polybutadiene, ethylene/vinyl acetate copolymers, propylene/α-olefin (having a carbon number of 2 to 12) copolymers, and the like. Conductive polymers may also be used.

As the conductive auxiliary used when necessary, known conductive auxiliaries can be used without any restrictions in particular. Examples include carbon blacks, carbon materials, fine powders of metals such as copper, nickel, stainless steel, and iron, mixtures of the carbon materials and fine metal powders, and conductive oxides such as ITO.

The content of the negative electrode active material in the negative electrode active material containing layer 18 is preferably 80 to 97 mass %, more preferably 85 to 96 mass %, based on the total amount of the negative electrode active material containing layer 18. When the active material content is less than 80 mass %, the energy density tends to become lower than that in the case where the content falls within the range mentioned above. When the active material content exceeds 97 mass %, the bonding force tends to become weaker, thereby lowering the cycle characteristic as compared with the case where the content falls within the range mentioned above.

The positive electrode active material containing layer 28 is mainly constituted by a positive electrode active material and a binder. Preferably, the positive electrode active material containing layer 28 further contains a conductive auxiliary.

While the positive electrode active material is not limited in particular as long as it allows occlusion and release of lithium ions, desorption and insertion (intercalation) of lithium ions, or doping and undoping of lithium ions and their counteranions (e.g., $ClO_4^-$) to proceed reversibly, the lithium-ion secondary battery of the present invention contains at least the above-mentioned active material of the present invention as the positive electrode active material.

When necessary, known positive electrode active materials may be used in addition to the active material of the present invention as the positive electrode active material. Examples of such positive electrode active materials include lithium cobaltate ($LiCoO_2$), lithium nickelate ($LiNiO_2$), lithium manganese spinel ($LiMn_2O_4$), mixed metal oxides expressed by the general formula of $LiNi_xCo_yMn_zM_aO_2$ (where $x+y+z+a=1$, $0 \leq x \leq 1$, $0 \leq y \leq 1$, $0 \leq z \leq 1$, $0 \leq a \leq 1$, and M is at least one kind of element selected from Al, Mg, Nb, Ti, Cu, Zn, and Cr), a lithium vanadium compound ($LiV_2O_5$), olivine-type $LiMPO_4$ (where M is at least one kind of element selected from Co, Ni, Mn, Fe, Mg, Nb, Ti, Al, and Zr, or VO), and mixed metal oxides such as lithium titanate ($Li_4Ti_5O_{12}$).

As the binder used in the positive electrode 20, one similar to the binder used in the negative electrode 10 can be employed. As the conductive auxiliary used in the positive electrode 20 when necessary, one similar to the conductive auxiliary used in the negative electrode 10 can be employed.

The current collector 26 of the positive electrode 20 is electrically connected to one end of the positive electrode lead 22 made of aluminum, for example, while the other end of the positive electrode lead 22 extends to the outside of the case 50. On the other hand, the current collector 16 of the negative electrode 10 is electrically connected to one end of the negative electrode lead 12 made of copper or nickel, for example, while the other end of the negative electrode lead 12 extends to the outside of the case 50.

The separator 40 arranged between the negative and positive electrodes 10, 20 is not limited in particular as long as it is formed from a porous body which is ionically permeable but electrically insulative; known separators used in lithium-ion secondary batteries can be employed. Examples include multilayer bodies of films made of any of polyethylene, polypropylene, and polyolefin; drawn films of mixtures of the polymers mentioned above; and fibrous nonwovens made of at least one constituent material selected from the group consisting of cellulose, polyester, and polypropylene.

The electrolytic solution (not depicted) fills the inner space of the case 50 and is partly contained within the negative electrode 10, positive electrode 20, and separator 40. Employed as the electrolytic solution is a nonaqueous electrolytic solution in which a lithium salt is dissolved in an organic solvent. As the lithium salt, salts such as $LiPF_6$, $LiClO_4$, $LiBF_4$, $LiAsF_6$, $LiCF_3SO_3$, $LiCF_3CF_2SO_3$, $LiC(CF_3SO_2)_3$, $LiN(CF_3SO_2)_2$, $LiN(CF_3CF_2SO_2)_2$, $LiN(CF_3SO_2)(C_4F_9SO_2)$, $LiN(CF_3CF_2CO)_2$, and the like can be used, for example. These salts may be used singly or in combinations of two or more. The electrolytic solution may be gelled by addition of polymers and the like thereto.

As the organic solvent, solvents used in known electrochemical devices can be employed. Preferred examples include propylene carbonate, ethylene carbonate, and diethyl carbonate. They may be used singly or in mixtures of two or more at any ratios.

The case 50 is formed from a pair of opposing films (first and second films 51, 52). Here, as illustrated in FIG. 2, the first and second films 51, 52 in this embodiment are connected to each other. That is, the case 50 in this embodiment is formed by bending a rectangular film made of a single composite package film at a bending line X3-X3 illustrated in FIG. 2, overlaying a pair of opposing edge parts of the rectangular film (an edge part 51B of the first film 51 and an edge part 52B of the second film 52 in the drawing) on each other, and bonding them together by an adhesive or heat-sealing. Here, 51A in FIGS. 1 and 2 and 52A in FIG. 2 refer to partial regions which are not bonded or not heat-sealed in the first and second films 51, 52.

The first and second films 51, 52 indicate film parts having respective surfaces opposing each other when a single rectangular film is bent as mentioned above. In this specification, respective edge parts of the first and second films 51, 52 after they are bonded together are referred to as "seal parts".

The film constituting the first and second films 51, 52 is a flexible film as mentioned above. Though this film is not limited in particular as long as it is a flexible film, it is preferably a "composite package film" having at least an innermost layer made of a polymer in contact with a power generating element 60 and a metal layer arranged on the side of the innermost layer opposite from the side in contact with the power generating element.

As illustrated in FIGS. 1 and 2, the part of the negative electrode lead 12 in contact with the seal parts of the outer bag constructed by the edge parts 51B, 52B of the first and second films 51, 52 is covered with an insulator 14 for preventing the negative electrode lead 12 from coming into contact with the metal layer in the composite package film constituting the films. The part of the positive electrode lead 22 in contact with the seal parts of the outer bag constructed by the edge parts 51B, 52B of the first and second films 51, 52 is covered with an insulator 24 for preventing the positive electrode lead 22 from coming into contact with the metal layer in the composite package film constituting the films.

The insulators 14, 24 may be formed from polymers, for example, though their structures are not restricted in particular. The insulators 14, 24 may be omitted when the negative and positive electrode leads 12, 22 can fully be prevented from coming into contact with the metal layers in their corresponding metal layers in the composite package film.

A method of manufacturing the above-mentioned lithium-ion secondary battery 1 will now be explained.

For making the power generating element 60 (multilayer body in which the negative electrode 10, separator 40, and positive electrode 20 are laminated in this order), known methods employed for manufacturing lithium-ion secondary batteries can be used without any restrictions in particular.

First, when making the negative and positive electrodes 10, 20, the constituents mentioned above are mixed and dispersed into a solvent in which the binder is soluble, so as to produce an electrode forming coating liquid (slurry, paste, or the like). The solvent is not limited in particular as long as the binder is soluble therein; examples include N-methyl-2-pyrrolidone and N,N-dimethylformamide.

Subsequently, the electrode forming coating liquid is applied onto a current collector surface, dried, and extended, so as to form an active material containing layer on the current collector, thereby completing the making of the negative and positive electrodes 10, 20. The technique for applying the electrode forming coating liquid to the current collector surface is not limited in particular, but may be determined as appropriate according to the material, form, and the like of the current collector. Examples of the coating method include metal mask printing, electrostatic coating, dip coating, spray coating, roll coating, doctor blading, gravure coating, and screen printing.

Thereafter, the negative and positive leads 12, 22 are electrically connected to thus prepared negative and positive electrodes 10, 20, respectively.

Subsequently, the separator 40 is arranged between the negative and positive electrodes 10, 20 so as to be in contact therewith (preferably in an unbonded state), thus completing the power generating element 60. Here, the surface F2 of the negative electrode 10 on the negative electrode active material containing layer 18 side and the surface F2 of the positive electrode 20 on the positive electrode active material containing layer 28 side are arranged so as to be in contact with the separator 40.

An example of methods of making the case 50 will now be explained. First, for constructing the first and second films from the above-mentioned composite package film, a known manufacturing method such as dry lamination, wet lamination, hot melt lamination, or extrusion lamination is used.

For example, a film to become a polymer layer and a metal foil made of aluminum or the like, which constitute the composite package film, are prepared. The metal foil can be prepared by extending a metal material, for example.

Subsequently, the metal foil is attached onto the film to become the polymer layer with an adhesive interposed therebetween, and so forth, so as to make a composite package film (multilayer film) preferably having the above-mentioned structure composed of a plurality of layers. Then, the composite package film is cut into a predetermined size, so as to prepare a rectangular film.

Next, as previously explained with reference to FIG. 2, the single film is bent, and the seal part 51B (edge part 51B) of the first film 51 and the seal part 52B (edge part 52B) of the second film 52 are heat-sealed with a sealer, for example, by a desirable seal width under a predetermined heating condition. Here, for securing an opening for introducing the power generating element 60 into the case 50, a part without heat-sealing is provided. This yields the case 50 with the opening.

Then, the power generating element 60 having the negative and positive electrode leads 12, 22 electrically connected thereto is inserted into the case 50 having the opening. Subsequently, the electrolytic solution is injected therein. Thereafter, while the negative and positive electrodes 12, 22 are partly inserted in the case 50, the opening of the case 50 is sealed with the sealer. This completes the making of the case 50 and lithium-ion secondary battery 1. The lithium-ion secondary battery of the present invention is not limited to the form illustrated in FIG. 1, but may have a cylindrical faun, for example.

Though a preferred embodiment of the present invention is explained in the foregoing, the present invention is not limited thereto. For example, in the explanation of the above-mentioned embodiment, the seal part of the lithium-ion secondary battery 1 may be bent, so as to yield a more compact structure. Though the above-mentioned embodiment explains the lithium-ion secondary battery 1 comprising one each of the negative and positive electrodes 10, 20, two or more each of the negative and positive electrodes 10, 20 may be provided while always arranging one separator 40 between each pair of the negative and positive electrodes 10, 20.

Another preferred embodiment of the lithium-ion secondary battery in accordance with the present invention will now be explained.

Figure 8:
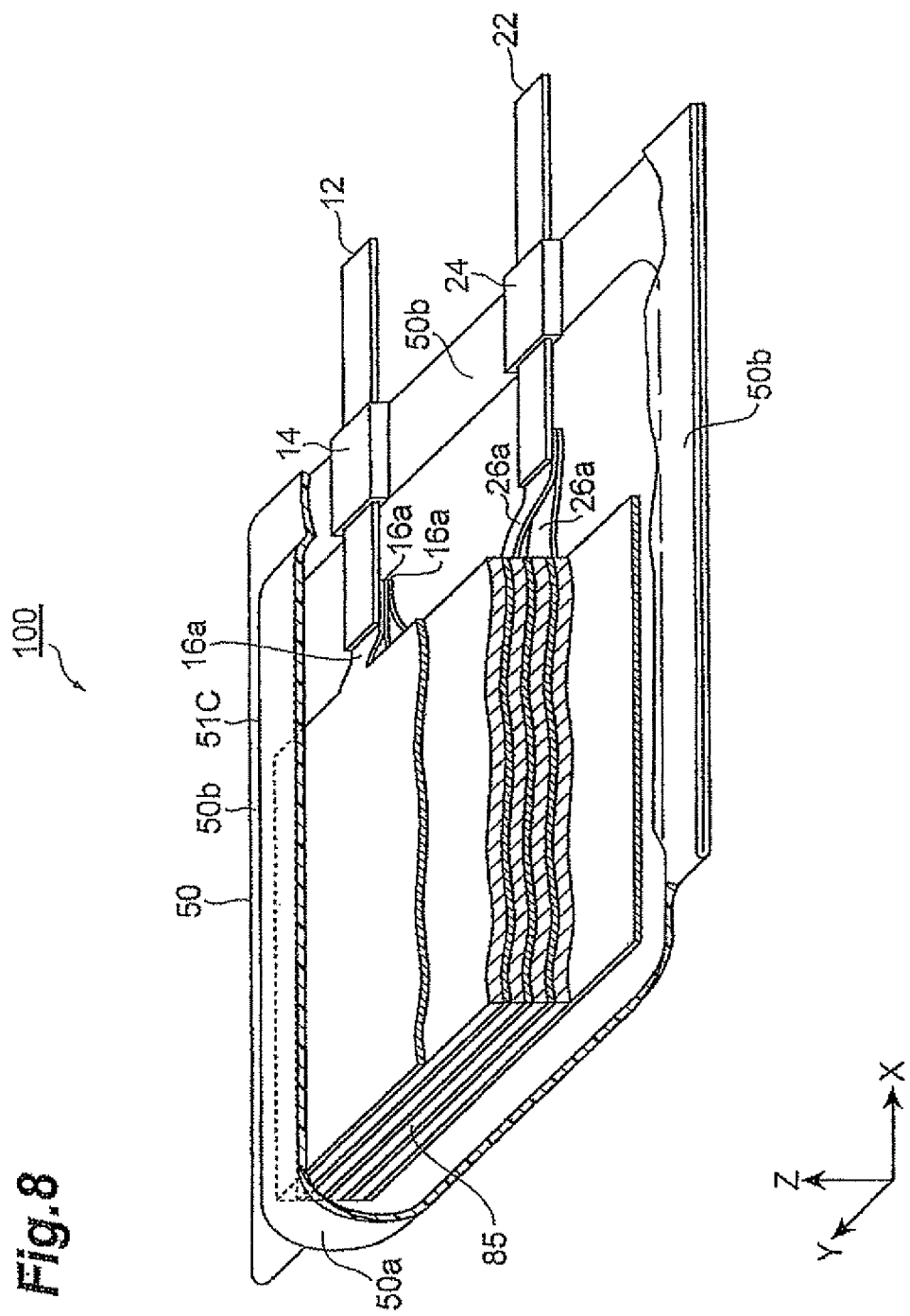
[FIG. 8] is a partly broken perspective view illustrating another preferred embodiment of the lithium-ion secondary battery in accordance with the present invention.
Figure 9:
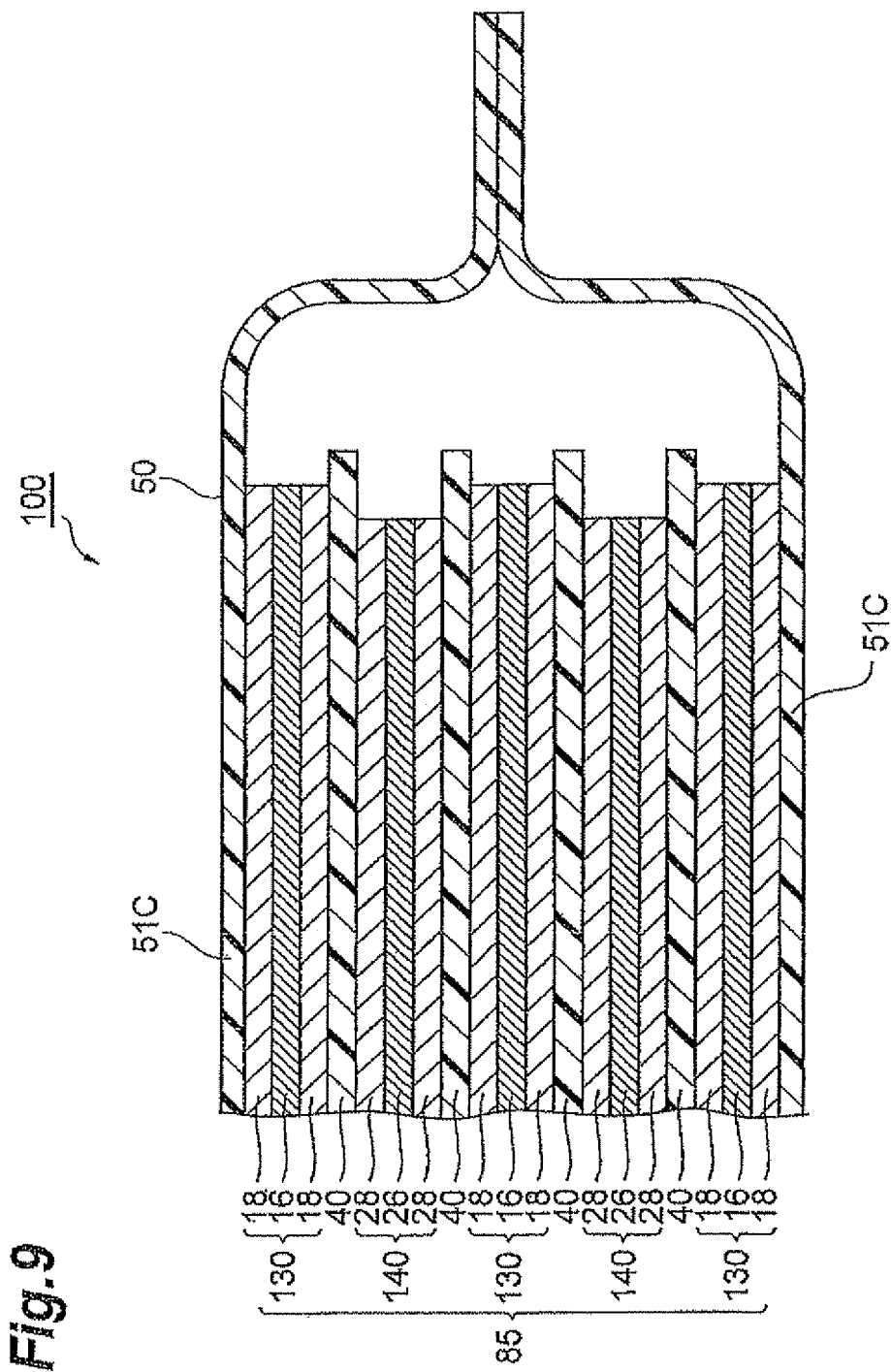
[FIG. 9] is a schematic sectional view of the lithium-ion secondary battery taken along the YZ plane of FIG. 8.

FIG. 8 is a partly broken perspective view illustrating the lithium-ion secondary battery 100 in accordance with this embodiment. FIG. 9 is a sectional view taken along the YZ plane of FIG. 8. As illustrated in FIGS. 8 and 9, the lithium-ion secondary battery 100 in accordance with this embodiment is mainly constituted by a multilayer structure 85, a case (outer package) 50 for accommodating the multilayer structure 85 in a closed state, and negative and positive leads 12, 22 for connecting the multilayer structure 85 to the outside of the case 50.

As illustrated in FIG. 9, the multilayer structure 85 is one in which a three-layer negative electrode 130, a separator 40, a three-layer positive electrode 140, a separator 40, a three-layer negative electrode 130, a separator 40, a three-layer positive electrode 140, a separator 40, and a three-layer negative electrode 130 are laminated in this order from the upper side.

Each three-layer negative electrode 130 has a current collector (negative electrode current collector) 16 and two negative electrode active material containing layers 18 formed on respective surfaces of the current collector 16. The three-layer negative electrode 130 is laminated such that the negative electrode active material containing layer 18 is in contact with the separator 40.

Each three-layer positive electrode 140 has a current collector (positive electrode current collector) 26 and two positive electrode active material containing layers 28 formed on respective surfaces of the current collector 26. The three-layer positive electrode 140 is laminated such that the positive electrode active material containing layer 28 is in contact with the separator 40.

The electrolytic solution (not depicted) fills the inner space of the case 50 and is partly contained within the negative electrode active material containing layers 18, positive electrode active material containing layers 28, and separators 40.

As illustrated in FIG. 8, respective ends of the current collectors 16, 26 are formed with tongues 16a, 26a extending outward. As illustrated in FIG. 8, the negative and positive electrode leads 12, 22 project from within the case 50 to the outside through a seal part 50b. An end part of the lead 12 within the case 50 is welded to the respective tongues 16a of the three current collectors 16, so that the lead 12 is electrically connected to the negative electrode active material containing layers 18 through the current collectors 16. On the other hand, an end part of the lead 22 within the case 50 is welded to the respective tongues 26a of the two current collectors 26, so that the lead 22 is electrically connected to the positive electrode active material containing layers 28 through the current collectors 26.

In the leads 12, 22, the parts held by the seal part 50b of the case 50 are coated with insulators 14, 24 made of a resin or the like in order to enhance sealability as illustrated in FIG. 8. The leads 12, 22 are separated from each other in a direction orthogonal to the laminating direction of the multilayer structure 85.

As illustrated in FIG. 8, the case 50, which is formed by folding a rectangular flexible sheet 51C into two at substantially the longitudinal center part thereof, holds the multilayer structure 85 from both sides in the laminating direction (vertical direction). Among end parts of the sheet 51C folded into two, the seal parts 50b in the three sides excluding the folded part 50a are bonded by heat-sealing or an adhesive, whereby the multilayer structure 85 is hermetically sealed within the case 50. The case 50 is also bonded to the insulators 14, 24 at the seal part 50b, so as to seal the leads 12, 22.

As the current collectors 16, 26, active material containing layers 18, 28, separators 40, electrolytic solution, leads 12, 22, insulators 14, 24, and case 50 in the lithium-ion secondary battery 100 illustrated in FIGS. 8 and 9, those made of constituent materials similar to their equivalents in the lithium-ion secondary battery 1 illustrated in FIGS. 1 to 7 are used.

When the multilayer structure 85 has a multilayer structure of three-layer negative electrode/separator/three-layer positive electrode/separator/three-layer negative electrode, i.e., both outermost layers are negative electrodes, it tends to suppress heating more effectively at the time of a nail penetration test. This effect is obtained as long as the multilayer structure 85 has a multilayer structure of negative electrode/separator/(positive electrode/separator/negative electrode)$_n$, where n is an integer of 1 or greater.

Though the lithium-ion secondary battery 100 illustrated in FIGS. 8 and 9 has four sets of secondary batteries, i.e., four sets of negative electrode/separator/positive electrode, as single cells, the number of sets may be more or less than 4.

Though the above-mentioned embodiment illustrates a mode in which each of the two outermost layers is a three-layer negative electrode 130 as a preferred mode, one or both of the outermost layers may be a two-layer negative electrode.

Though the above-mentioned embodiment illustrates a mode in which each of the two outermost layers is a negative electrode as a preferred mode, the two outermost layers may be positive and negative electrodes or both positive electrodes.

EXAMPLES

The present invention will now be explained more specifically with reference to an example and a comparative example, but is not limited to the following example.

Example 1

Making of Active Material

An aqueous $H_3PO_4$ solution in which 23.08 g of $H_3PO_4$ were dissolved in 500 g of water was introduced into a 1.5-L autoclave container, and $V_2O_5$ (18.37 g) was gradually added thereto. After completely adding $V_2O_5$, the container was hermetically closed, and reflux was carried out for 16 hr at 95° C. with stirring at 200 rpm. After completing the reflux, the container was once opened when its temperature dropped to room temperature, and $LiOH.H_2O$ (8.48 g) and $C_6H_8O_6$ (7.13 g) were gradually added. Thereafter, the container was hermetically closed again and held at 160° C. for 8 hr. Thus obtained mixture was washed with about 300 ml of water added thereto. The washed product was heated at 90° C. for about 23 hr in an oven and then pulverized by high-speed rotary pulverization, thus yielding a gray powder.

Thus obtained powder was put into an alumina crucible and heated from room temperature to 550° C. in 45 min. After being heat-treated for 4 hr at 550° C., the powder was rapidly cooled, whereby a brownish-red fired powder was obtained. The resulting fired powder was classified into the range of 0.05 to 0.1 μm by centrifugal airflow classification, whereby spherical crystal particles were obtained as an active material. X-ray powder diffraction patterns of the crystal particles were measured and, as a result, it was verified that the obtained crystal particles were triclinic (α type) $LiVOPO_4$ crystals exhibiting the X-ray diffraction pattern described in JCPDS card 72-2253.

Figure 10:
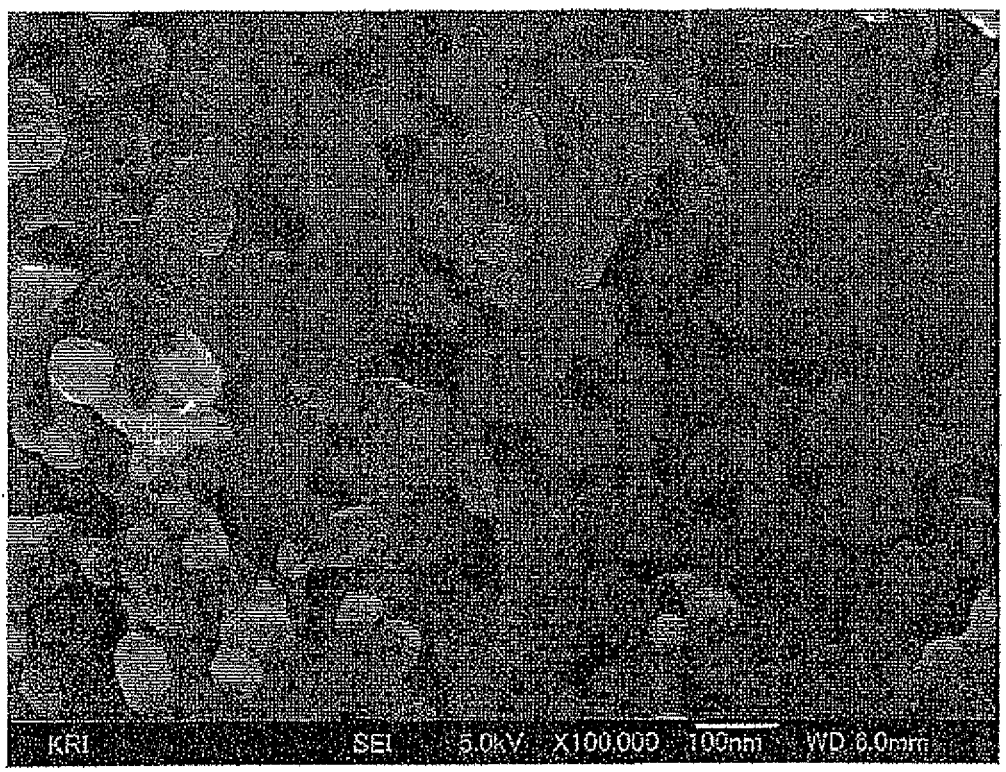
[FIG. 10] is an electron micrograph of spherical triclinic $LiVOPO_4$ crystal particles obtained by Example 1 (magnification: ×100,000).

FIG. 10 is an electron micrograph of thus obtained triclinic $LiVOPO_4$ crystal particles (magnification: ×100,000). As illustrated in FIG. 10, the obtained triclinic $LiVOPO_4$ crystal particles had spherical forms. The particle size (longer diameter) and the longer to shorter diameter ratio (longer diameter/shorter diameter) of each of given 10 crystal particles were measured by electron microscopic observation, and average values were determined. As a result, the average particle size was 92 mm, the longer to shorter diameter ratio (average value) was 1.6, and the BET specific surface area was 7.5 $m^2/g$.

Making of Lithium-Ion Secondary Battery

A mixture of 84 parts by mass of the above-mentioned active material, 8 parts by mass of acetylene black, and 8 parts by mass of polyvinylidene fluoride (PVdF) was dissolved into N-methylpyrrolidone (NMP), so as to yield a slurry-like positive electrode coating liquid. This coating liquid was applied to an Al foil by doctor blading and then dried, so as to form a positive electrode active material containing layer. This yielded a positive electrode in which a current collector having a thickness of 15 μm and an active material containing layer having a thickness of 50 μm were laminated.

A mixture of 92 parts by mass of natural graphite (product name: OMAC, manufactured by Osaka Gas Chemicals Co., Ltd.) and 8 parts by mass of polyvinylidene fluoride (PVdF) was dissolved into NMP, so as to yield a slurry-like negative electrode coating liquid. This coating liquid was applied to an Al foil by doctor blading and then dried, so as to form a negative electrode active material containing layer. This yielded a negative electrode in which a current collector having a thickness of 15 μm and an active material containing layer having a thickness of 45 μm were laminated.

A mixed solvent was obtained by mixing 20 parts by volume of propylene carbonate (PC), 10 parts by volume of ethylene carbonate (EC), and 70 pars by volume of diethyl carbonate. Lithium hexafluorophosphate ($LiPF_6$) was dissolved into the mixed solvent such as to yield a concentration of 1.5 mol·$dm^{-3}$, whereby an electrolytic solution was obtained.

The above-mentioned negative electrode was punched into a size of 17.5 mm×34.5 mm, while the above-mentioned positive electrode was punched into a size of 17 mm×34 mm, and a separator made of polyethylene was arranged between and laminated with the negative and positive electrodes, so as to form a battery matrix. Thus obtained battery matrix was put into an aluminum-laminated film, the above-mentioned electrolytic solution was injected therein, and the film was sealed under vacuum. A lithium-ion secondary battery was made by the foregoing procedure.

Comparative Example 1

Making of Active Material $LiNO_3$, $V_2O_5$, and $H_3PO_4$ were dissolved into water at a molar ratio of 2:1:2. Thus obtained solution was evaporated to dryness at 25° C., dried for 20 hr at 25° C., and then pulverized in a mortar.

The resulting pulverized product was put into an alumina crucible and heated from room temperature to 700° C. in 45 min. After being heat-treated for 4 hr at 700° C., the product was rapidly cooled, whereby a fired powder was obtained. The resulting fired powder was classified into the range of 0.5 to 1 μm by centrifugal airflow classification, whereby spherical crystal particles were obtained as an active material. X-ray powder diffraction patterns of the crystal particles were measured and, as a result, it was verified that the obtained crystal particles were triclinic (a type) $LiVOPO_4$ crystals exhibiting the X-ray diffraction pattern described in JCPDS card 72-2253. The particle size (longer diameter) of each of given 10 spherical crystal particles was measured by electron microscopic observation, and an average value was determined. As a result, the average particle size was 558 nm.

Making of Lithium-Ion Secondary Battery

A mixture of 84 parts by mass of the above-mentioned active material, 8 parts by mass of acetylene black, and 8 parts by mass of polyvinylidene fluoride (PVdF) was dissolved into N-methylpyrrolidone (NMP), so as to yield a slurry-like positive electrode coating liquid. This coating liquid was applied to an Al foil by doctor blading and then dried, so as to form a positive electrode active material containing layer. This yielded a positive electrode in which a current collector having a thickness of 15 μm and an active material containing layer having a thickness of 50 μm were laminated. Except for using this positive electrode, a lithium-ion secondary battery was made as in Example 1.

Measurement of Discharge Capacity

The discharge capacity of each of the lithium-ion secondary batteries obtained by the above-mentioned Example and Comparative Example was measured by performing constant current constant voltage charging to 4.2 V with a current equivalent to 0.5 C and then discharging to 2.5 V with a current equivalent to 0.5 C, and a discharge capacity per unit mass of $LiVOPO_4$ was calculated. Table 1 lists the results.

Measurement of Rate Characteristic

For each of the lithium-ion secondary batteries obtained by the above-mentioned Example and Comparative Example, the discharge capacity at 0.1 C (the current value at which constant current discharging at 25° C. completes in 10 hr) and the discharge capacity at 1 C (the current value at which constant current discharging at 25° C. completes in 1 hr) were measured, and the ratio (%) of the discharge capacity at 1 C to the discharge capacity at 0.1 C was determined as a rate characteristic. Table 1 lists the results.

Measurement of Cycle Characteristic

Each of the lithium-ion secondary batteries obtained by the above-mentioned Example and Comparative Example was charged at a rate of 1 C by CCCV to 4.2 V. Thereafter, constant current discharging was carried out at a rate of 1 C to 2.5 V. Counting this set of operations as 1 cycle, 100 cycles were carried out, and the ratio (%) of the discharge capacity at the 100th cycle to that at the first cycle was determined as a cycle characteristic. Tale 1 lists the result.

TABLE 1

| | Active material | | | | |
|---|---|---|---|---|---|
| | Crystal system | Average particle size [nm] | Discharge capacity [mAh/g] | Rate characteristic (1 C/0.1 C) [%] | Cycle characteristic [%] |
| Example 1 | triclinic | 92 | 99 | 84 | 89 |
| Comparative Example 1 | triclinic | 558 | 82 | 67 | 73 |

What is claimed is:

1. A method for manufacturing an active material containing a triclinic $LiVOPO_4$ crystal particle, the method comprising:
    a step of manufacturing the crystal particle by hydrothermal synthesis;
    wherein the crystal particle has a spherical form and an average particle size of 20 to 200 nm.

2. The method of claim 1, wherein the step of manufacturing the crystal particle by hydrothermal synthesis comprises:
    a first heat treatment step of heat-processing at least an aqueous phosphate compound solution and a vanadium-containing compound that are sealed in a closed container; and
    a second heat treatment step of adding an Li-containing compound to the resulting product of the first heat treatment step and further heat-processing the mixture.

3. The method of claim 1, wherein the crystal particle has a BET specific surface area of 2 to 50 $m^2/g$.

4. The method of claim 2, wherein the crystal particle has a BET specific surface area of 2 to 50 $m^2/g$.

5. The method of claim 1, wherein the crystal particle has a longer to shorter diameter ratio (longer diameter/shorter diameter) of 1 to 2.

6. The method of claim 2, wherein the crystal particle has a longer to shorter diameter ratio (longer diameter/shorter diameter) of 1 to 2.

7. The method of claim 3, wherein the crystal particle is a longer to shorter diameter ratio (longer diameter/shorter diameter) of 1 to 2.

8. The method of claim 4, wherein the crystal particle is a longer to shorter diameter ratio (longer diameter/shorter diameter) of 1 to 2.

9. A method for manufacturing a positive electrode containing an active material, comprising:
    a step of manufacturing the active material by the method of claim 1.

10. A method for manufacturing a lithium-ion secondary battery including a positive electrode, comprising:
    a step of manufacturing the positive electrode by the method of claim 9.

* * * * *